(12) United States Patent
Lewis et al.

(10) Patent No.: US 10,260,373 B2
(45) Date of Patent: Apr. 16, 2019

(54) FLOW SPLITTER FOR A FLUID SYSTEM OF A GAS TURBINE ENGINE

(71) Applicant: Rolls-Royce Corporation, Indianapolis, IN (US)

(72) Inventors: Jennifer Ann Lewis, Danville, IN (US); Duane Allen Morris, Indianapolis, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 651 days.

(21) Appl. No.: 14/319,961

(22) Filed: Jun. 30, 2014

(65) Prior Publication Data

US 2014/0311155 A1 Oct. 23, 2014

Related U.S. Application Data

(63) Continuation of application No. PCT/US2012/072233, filed on Dec. 30, 2012.

(Continued)

(51) Int. Cl.
*F01D 25/18* (2006.01)
*F16L 41/02* (2006.01)
(Continued)

(52) U.S. Cl.
CPC ............ *F01D 25/18* (2013.01); *F01D 25/20* (2013.01); *F02C 7/14* (2013.01); *F02C 7/18* (2013.01);
(Continued)

(58) Field of Classification Search
CPC ...... F01D 25/18; F01D 25/183; F01D 25/186; F01D 25/20; F01D 25/22; F05D 2260/98;
(Continued)

(56) References Cited

U.S. PATENT DOCUMENTS

| 253,908 | A | * | 2/1882 | Brady | ...................... F15D 1/02 138/37 |
| 445,090 | A | * | 1/1891 | Sewall | ............... B61D 27/0036 237/37 |

(Continued)

FOREIGN PATENT DOCUMENTS

| DE | 2205180 A1 | * | 8/1973 | ............. F16L 41/02 |
| FR | 625733 A | * | 8/1927 | ................ F04F 5/46 |

(Continued)

OTHER PUBLICATIONS

European Search Report in corresponding European patent application (i.e., EP 12 872 022.4), dated Aug. 19, 2015 (8 pages).

(Continued)

*Primary Examiner* — Gerald L Sung
*Assistant Examiner* — Marc J Amar
(74) *Attorney, Agent, or Firm* — Duane Morris LLP

(57) ABSTRACT

A gas turbine engine is disclosed having a working fluid system capable of moving a working fluid. The working fluid system includes a flow splitter capable of splitting the working fluid into different streams. In one form the flow splitter member is a T-shape, but other embodiments can take on other shapes. The flow splitter can include an internal scoop used to split the flow. In one form internal scoop is annular in shape and includes a turn to direct a split flow.

17 Claims, 3 Drawing Sheets

Related U.S. Application Data

(60) Provisional application No. 61/582,270, filed on Dec. 31, 2011.

(51) Int. Cl.
  *F16L 39/00* (2006.01)
  *F01D 25/20* (2006.01)
  *F02C 7/22* (2006.01)
  *F02C 7/14* (2006.01)
  *F02C 7/18* (2006.01)

(52) U.S. Cl.
  CPC ............ *F02C 7/222* (2013.01); *F16L 39/00* (2013.01); *F16L 41/02* (2013.01); *F16L 41/021* (2013.01); *F05D 2260/20* (2013.01); *F05D 2260/602* (2013.01); *F05D 2260/98* (2013.01); *Y02T 50/675* (2013.01); *Y10T 137/85938* (2015.04)

(58) Field of Classification Search
  CPC ...... F02C 7/06; F02C 7/14; F02C 7/32; Y10T 137/85938; F16L 39/00; F16L 41/02; F16L 41/021; F16L 47/32
  USPC ...... 60/39.08; 137/561 A; 210/167.02, 416.5
  See application file for complete search history.

(56) References Cited

U.S. PATENT DOCUMENTS

| | | | | |
|---|---|---|---|---|
| 598,327 | A * | 2/1898 | Schlemmer | F15D 1/02 138/37 |
| 783,586 | A * | 2/1905 | Luff | F15D 1/02 137/216.1 |
| 933,279 | A * | 9/1909 | Welch | E03C 1/284 137/216.1 |
| 1,086,143 | A * | 2/1914 | Davidson | F15D 1/02 138/37 |
| 1,586,691 | A | 6/1926 | Murray, Jr. | |
| 2,141,797 | A * | 12/1938 | Minella | F16L 41/02 138/37 |
| 2,164,011 | A * | 6/1939 | Hilborn | A01G 13/06 137/561 A |
| 2,304,609 | A * | 12/1942 | Stokes | F24D 19/0002 138/37 |
| 2,939,626 | A | 6/1960 | Birmann | |
| 3,406,699 | A | 10/1968 | Fischer | |
| 3,510,156 | A * | 5/1970 | Markowz | F16L 5/00 285/122.1 |
| 4,020,632 | A * | 5/1977 | Coffinberry | F02C 7/14 123/41.33 |
| 4,057,371 | A | 11/1977 | Pilarczyk | |
| 4,446,377 | A * | 5/1984 | Kure-Jensen | F02C 7/32 184/6.11 |
| 4,473,035 | A * | 9/1984 | Gorzegno | F22B 29/065 122/235.12 |
| 4,494,567 | A | 1/1985 | Troyen | |
| 4,578,188 | A * | 3/1986 | Cousino | E03F 5/12 137/561 A |
| 4,645,415 | A | 2/1987 | Hovan et al. | |
| 4,729,228 | A * | 3/1988 | Johnsen | F04B 39/0207 137/561 A |
| 5,131,807 | A * | 7/1992 | Fischer | F01D 25/22 415/111 |
| 5,322,387 | A * | 6/1994 | Heine | E03F 1/002 137/561 A |
| 5,622,207 | A | 4/1997 | Frank | |
| 6,412,820 | B1 * | 7/2002 | Erps | F16L 19/005 285/123.1 |
| 6,712,080 | B1 * | 3/2004 | Handschuh | B08B 9/0321 134/103.1 |
| 6,886,324 | B1 * | 5/2005 | Handshuh | F01D 25/20 60/39.08 |
| 7,174,919 | B2 * | 2/2007 | Kenyon | F01N 13/08 138/37 |
| 8,833,086 | B2 * | 9/2014 | Parnin | F02C 7/06 184/6.11 |
| 2005/0035592 | A1 * | 2/2005 | Williams | F16L 41/021 285/125.1 |
| 2009/0212555 | A1 * | 8/2009 | Sisk | F16L 41/021 285/133.11 |
| 2010/0223905 | A1 | 9/2010 | Todorovic et al. | |
| 2011/0048856 | A1 * | 3/2011 | Thivierge | F01D 25/20 184/6.11 |
| 2014/0331639 | A1 * | 11/2014 | Raimarckers | F01C 21/045 60/39.08 |
| 2015/0128597 | A1 * | 5/2015 | Schlak | F03B 13/00 60/719 |
| 2015/0251766 | A1 * | 9/2015 | Atkey | B64D 13/08 244/13 |
| 2015/0330869 | A1 * | 11/2015 | Ziarno | G01M 15/14 701/34.4 |
| 2016/0076461 | A1 * | 3/2016 | Kawai | F02C 9/40 60/772 |

FOREIGN PATENT DOCUMENTS

| | | | | |
|---|---|---|---|---|
| GB | 1210994 | A * | 11/1970 | ............ F16L 41/021 |
| GB | 2083879 | A * | 3/1982 | ............ B29C 53/76 |
| WO | 2005035946 | A1 | 4/2005 | |

OTHER PUBLICATIONS

International Search Report and Written Opinion, PCT/US2012/072233, dated Aug. 23, 2013.

\* cited by examiner

FLOW SPLITTER FOR A FLUID SYSTEM OF A GAS TURBINE ENGINE

CROSS-REFERENCE TO RELATED APPLICATIONS

The present application is a continuation of PCT Application No. PCT/US2012/072233, filed Dec. 30, 2012, which claims the benefit of U.S. Provisional Patent Application 61/582,270, filed Dec. 31, 2011, each of which are incorporated herein by reference.

GOVERNMENT RIGHTS

The present application was made with the United States government support under Contract No. PB68OD. The United States government has certain rights in the present application.

TECHNICAL FIELD

The present invention generally relates to gas turbine engine working fluid systems, and more particularly, but not exclusively, to gas turbine engine lubricant that split fluid flow streams.

BACKGROUND

Providing gas turbine engine working fluid devices that are capable of splitting flow of working fluids, such as lubricants, remains an area of interest. Some existing systems have various shortcomings relative to certain applications. Accordingly, there remains a need for further contributions in this area of technology.

SUMMARY

One embodiment of the present invention is a unique flow splitter. Other embodiments include apparatuses, systems, devices, hardware, methods, and combinations for splitting flow streams of working fluid. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
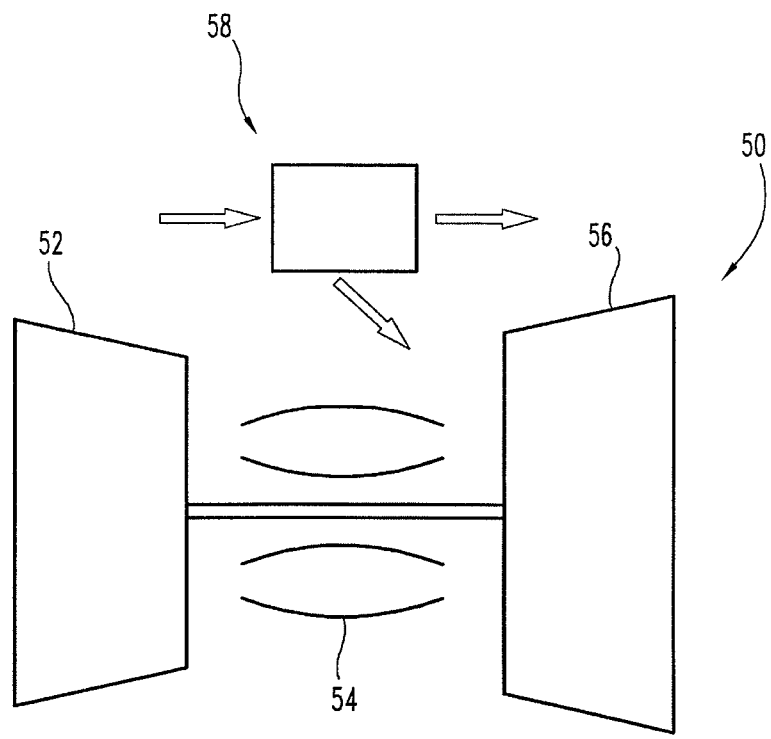
FIG. 1 is an embodiment of a gas turbine engine having a working fluid system.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, a gas turbine engine 50 is disclosed having a compressor 52, combustor 54, and turbine 56 which together operate to provide power and/or thrust, among other potential uses. The gas turbine engine is depicted as a single spool turbojet engine in the illustrated embodiment but other embodiments can take on any variety of forms. For example, the gas turbine engine 50 can have multiple spools configured to have any number of rotating turbomachinery components, and alternatively and/or additional can be arranged as a turbofan, turboshaft, or turboprop engine. The gas turbine engine can be adaptive and/or configurable cycle engine, and furthermore can be integrated with any number of systems. In short, the gas turbine engine 50 has any number of uses and can take on any variety of embodiments.

In one form the gas turbine engine 50 is coupled with an aircraft to provide power. As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the present inventions are contemplated for utilization in other applications that may not be coupled with an aircraft such as, for example, industrial applications, power generation, pumping sets, naval propulsion, weapon systems, security systems, perimeter defense/security systems, and the like known to one of ordinary skill in the art.

The gas turbine engine 50 of FIG. Us depicted as having a working fluid system 58 useful to provide a working fluid to components and systems of, or coupled to, the gas turbine engine 50, some of which will be described further below. The working fluid system 58 can provide a supply of working fluid in a close circuit. In one non-limiting form the working fluid system 58 operates such that the working fluid recirculates within the system during operation of the gas turbine engine 50. The working fluid can take on a variety of forms and can be useful in a number of different manners. In one form the working fluid can have usefulness in providing lubrication and/or heat transfer to the components and systems. Reference will be made below to a lubricant but no limitation is hereby intended as to the type of useful working fluid used in the system. The lubricant provided by the lubrication system 58 can flow within the system through any number of passageways that can have flow splits and flow mergers. These passageways can be created by conduits such as but not limited to hoses and ducts that can be connected with other structures that provide lubricant to various components and structures of or coupled to the gas turbine engine or related accessories. The lubricant used in the lubrication system can be used primarily to facilitate relative movement of coupled parts. In some additional forms the lubricant can have a subsidiary purpose of transferring heat from relatively high temperature regions to relatively low temperature regions of the coupled parts, gas turbine engine, related accessories, etc. In alternative embodiments the lubricant can have a primary role of facilitating heat transfer, such as cooling, with a subsidiary role of facilitating relative movement of parts. The lubricant can be an oil, whether natural, synthetic, processed, etc. and can have any variety of characteristics.

Figure 2:
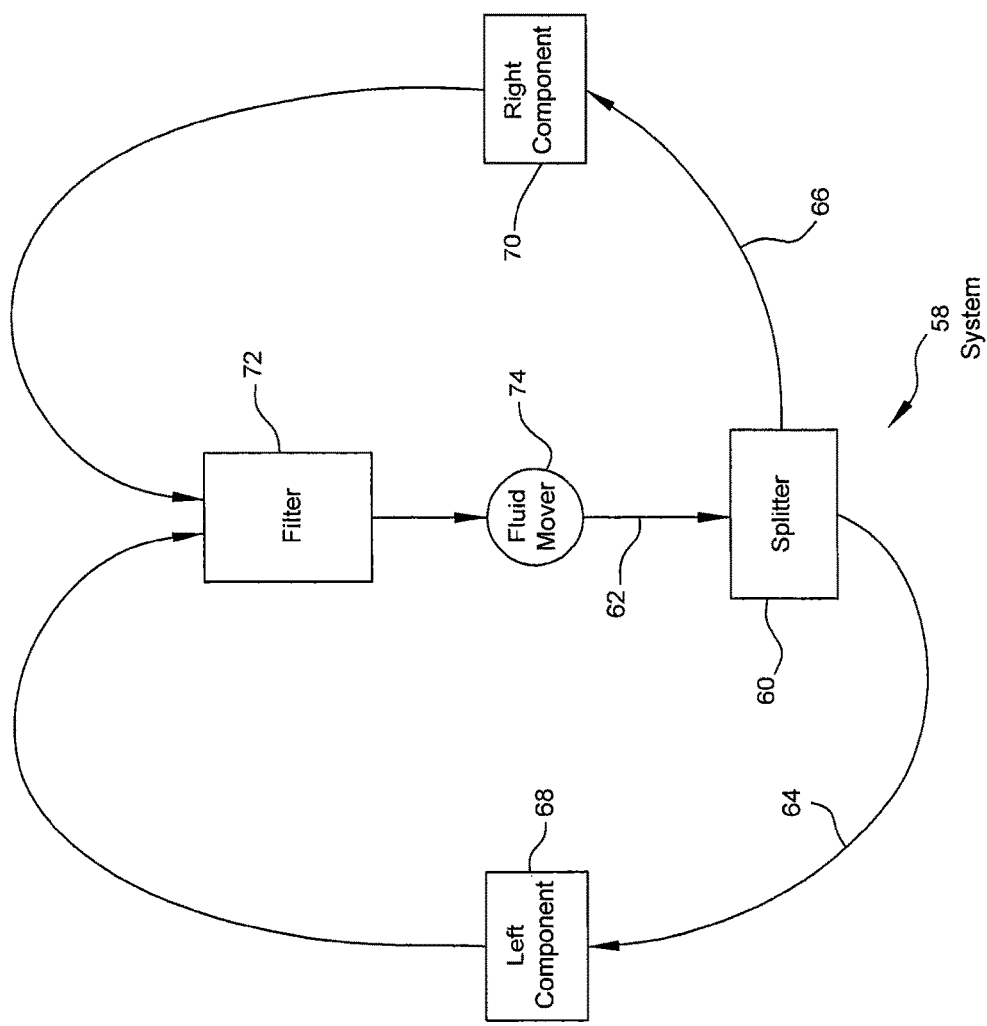
FIG. 2 is an embodiment of a working fluid system.

One form of the working fluid system 58 is shown in FIG. 2 and includes a splitter 60 that is shown as receiving a top side flow of lubricant 62 and splitting it to a right side flow of lubricant 64 and a bottom side of lubricant 66. As used herein, the terms "top", "bottom", "left", and "right" are used for ease of reference and convenience only to distinguish the separate flows of lubricant as depicted in the illustrated embodiment of the FIG. 2, but no limitation is hereby intended as to an orientation that may be used in a physical embodiment. An embodiment of the splitter 60 will be shown below in FIG. 3.

In the illustrated embodiment of FIG. 2, working fluid can be provided by the system 58 to any number of components, structures, accessories, etc of or connected with the gas turbine engine 50. As depicted in FIG. 2, working fluid is provided to a left side component 68 and a right side component 70. In one non-limiting form the left side component 68 can represent a gas turbine engine core section and the working fluid a lubricant such as oil for the core section. The lubricant can be used in an area radially inward of a flow path of the core section to assist components that are moving relative to each other such as bearings, etc. The passageway(s) that the working fluid will flow through the core section can be circuitous and can be defined by various structures of the core section. A sump can be used in the core section to collect the lubricant either before or after dispersal through the core section. The right side component 70 can represent another portion of the gas turbine engine and in some embodiments can represent an auxiliary gear box driven by work extracted from the gas turbine engine. The lubricant can also be used to assist in facilitating relative movement of parts in the accessory gear box. The passageway(s) that the working fluid will flow through the gear box can be defined by various structures. A reservoir can be used in some embodiments to collect the lubricant.

A filter 72 can be used to recondition the working fluid and remove particulates that may be in the working fluid. The filter 72 can take a variety of forms such as a media based filter and a centrifugal type filter, among potential others. The filter 72 is depicted as a single block in the illustrated embodiment but additional filters arranged in series and/or in parallel can also be used. In one non-limiting embodiment the filter 72 can be a scavenge oil filter for the gas turbine engine 50.

The filter 72 can provide working fluid to a fluid mover 74 that assists in propelling the working fluid in the system 58. The fluid mover 74 can take a variety of forms such as a reciprocating pump, compressor, hydraulic pump, etc. The fluid mover 74 can be capable of providing working fluid at a variety of pressures and flow rates.

Though the illustrated embodiment shows particular flow locations of the filter 72, fluid circulator 74, and components 68 and 70, it will be appreciated that other embodiments can include other alternative locations and configurations than that depicted.

Figure 3:
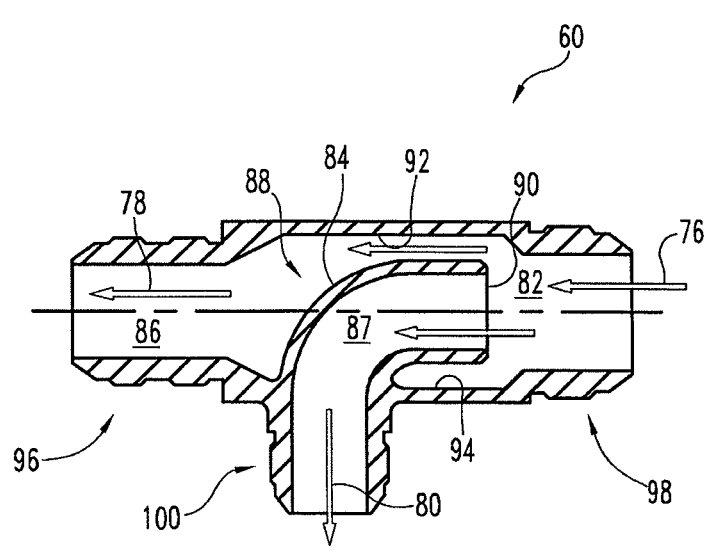
FIG. 3 is an embodiment of a flow splitter.

Turning now to FIG. 3, one embodiment of the splitter 60 is shown depicting an internal view and illustrates the embodiment providing internal flow passageways such that a right side flow 76 is split to form a left side flow 78 and a bottom flow 80. The illustrated embodiment in the figure depicts a "T" configuration in which the arms of the splitter 60 are shaped at right angles in the form of a T, but other embodiments can take on other configurations. For example, some embodiments can more closely resemble a Y-shape, while still further embodiments take on other shapes having arms that do not readily resemble a character from the alphabet.

The splitter 60 includes right side passage 82 that receives the right side flow 76 and that leads to a scoop 84 used to receive a portion of the right side flow 76. The portion of lubricant not received in the scoop 84 is routed out of the splitter 60 through the left side passage 86. The scoop 84 can be used to receive any proportion of the right side flow 76.

In some forms the proportions received in the scoop 84 and to the left side passage 86 can be substantially the same, but other embodiments can include other proportions.

The scoop 84 includes a scoop passage 87 that is oriented to turn the lubricant to a different direction than the direction of the right side flow 76 and in the illustrated form includes a turned section 88 that is curved intermediate the ends depicted in the figure. The scoop passage 87 and/or turned section 88 can have any number of cross sectional shapes and associated wall geometries. In the illustrated embodiment the geometry of the upper wall in the is a constant radius curve, but in other forms the wall can include variable radius curves, piecewise linear walls, and any assortment of other types. The cross sectional shape of the scoop passage 87 can vary along the length of the scoop 84. In the illustrated embodiment the scoop passage 87 is generally circular in cross sectional shape between its ends, but in other forms the cross section can take on other shapes. For example the cross sectional shape can be curved such as ellipsoidal, can be faceted such as but not limited to square, triangular, or can be an arbitrary shape having a combination of curved and faceted surfaces, to set forth just a few nonlimiting embodiments. The shape can also vary over the length of the scoop 84.

The scoop 84 is shown having an inlet 90 that is offset from internal walls of the splitter 60. In some forms the inlet 90 can be equally offset from a top wall 92 and a bottom wall 94, but not all embodiments need be equally spaced. The spacing of the inlet 90 relative to the internal walls can also be equidistant. In some forms the inlet 90 can be biased toward an internal wall of the splitter 60. To set forth a few non-limiting examples, the inlet 90 can be biased toward the bottom wall 94 in some forms, and in other still forms it can be alternatively and/or additional be biased against a side wall. In some forms the scoop can rest against the internal wall of the splitter 60, such as for example an inlet 90 that uses the bottom wall 94 as a wall for its internal passage. In this way the scoop can utilize multiple walls, whether bottom, side, top, etc. For example, in some forms where the internal geometry of the splitter 60 between the right side passage 82 and the left side passage 86 is round or circular, the inlet 90 can span the bottom and side of the wall.

The wall of the scoop 84 that forms one or more sides of the scoop passage 87 can have any variety of dimensions and in the illustrated form is shown having a constant thickness. In some forms the wall of the scoop 84 can have varying thickness dependent upon its location. For example, the thickness can be smaller near the inlet 90 and grow increasingly thick in some forms, while in others the thickness can be relatively large near the inlet 90 and grow progressively thinner along a length of the scoop passage 87.

The leading edge of the inlet to the scoop can have a chamfered end as shown in the illustrated embodiment. Some forms of the inlet can include other shapes, such as a blunt curved shape, a blunt right angle shape, along with any number of others. In some forms the inlet can be located in a plane that is presented at a right angle to the stream of lubricant, as shown in the illustrated embodiment, but in other forms the inlet can be located in a plane formed at an angle. For example, the top portion of the inlet can be set back further downstream than the bottom portion of the inlet, thus forming an inlet that is shaped as having a cut that falls from the upper left to the lower right of the figure. In still further forms the leading edge of the inlet can have a variety of shapes that are not confined to a plane. Any variety of other shapes and configurations of the leading edge of the inlet are also contemplated.

The internal through-passage of the splitter 60 that extends between the ends of the illustrated splitter and that includes the right side passage 82 and the left side passage 86 can have any variety of cross sectional shapes and wall geometries. In one form the internal passage is configured as circular in cross sectional shape, but other shapes of the internal through-passage are contemplated. The cross sectional shape can take on other curved or faceted shapes, or a combination of the two. In addition, the area of the internal through passage can change as it extends between the ends of the illustrated splitter.

As shown in the illustrated embodiment the internal through-passage includes step out in an internal wall shown at the top and bottom of the figure in the axial location region where the scoop 84 is located. Such a step out can correspond to an increase in cross sectional area of the through-passage in the area where the scoop 84 is located to account for a decrease in effective cross sectional area owing to the presence of the walls of the scoop passage 87. The cross sectional area may not change in other embodiments where the step out does not extend around the entire inner periphery of the through-passage. For example, a side wall (not shown) may include a step-in to offset, or partially offset, a step out as shown in the upper and lower portions of the through-passage. The step-out, furthermore, on the upstream side can be different than the step-out on the downstream side, as is reflected in the illustrated embodiment. Some forms, however, may be the same.

The splitter 60 can include provisions 96, 98, and 100 that permit the splitter 60 to be connected on the left side, right side, and bottom to passageway couplings, such as but not limited to hose couplings. Such couplings can be of a quick connect variety, but can take on other forms such as but not limited to threaded couplings. These and other variations are contemplated herein to permit the splitter 60 to be coupled with passageways such as hoses.

Figure 4:
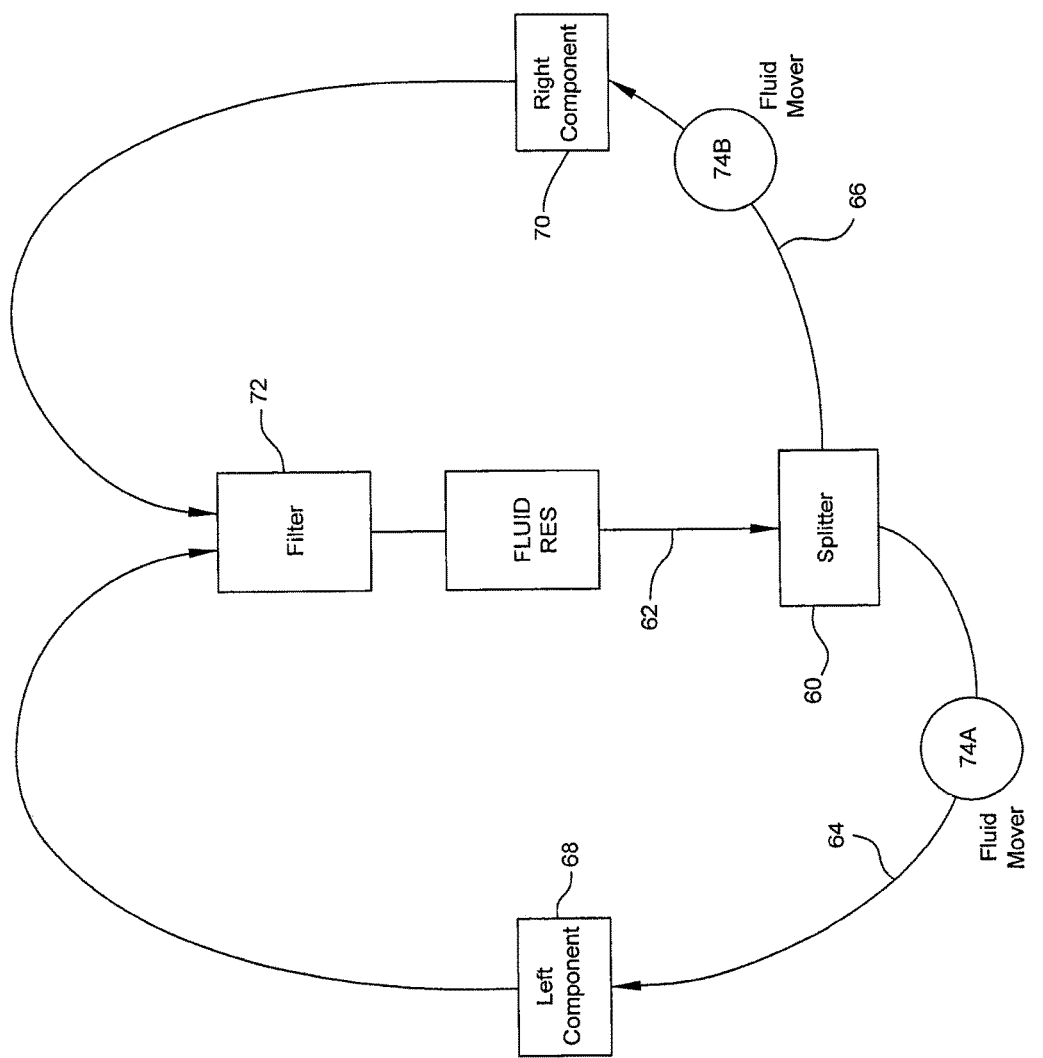
FIG. 4 is an embodiment of a working fluid system.

Turning now to FIG. 4, another embodiment of a working fluid system is shown. In some respects similar to FIG. 3, the embodiment of FIG. 4 locates a fluid tank, or fluid reservoir, (denoted as "FLUID RES" in the illustration) upstream from the flow splitter 60 and oriented to receive flow from the filter 72. The splitter 60 is used to split flow from the fluid tank, or fluid reservoir, and route it to fluid mover 74A on a left side, and a fluid mover 74B on the right side. The fluid movers 74A and 74B move fluid to their respective components 68 and 70. In one form the fluid tank, or fluid reservoir is configured at a height above the splitter 60 such that fluid is fed to the splitter 60 via gravity. Any of various heights can be used to provide an appropriate gravity feed for the splitter 60. As will be appreciated, similar reference numerals refer to similar features between the various illustrations. For example, the fluid movers 74A and 74B will be appreciated as being similar to fluid mover 74. Accordingly, the fluid movers 74A and 74B can take a variety of forms such as a reciprocating pump, compressor, hydraulic pump, etc.

One aspect of the present application provides an apparatus comprising a gas turbine engine having a rotatable turbomachinery that includes a compressor and turbine, the gas turbine engine also having a combustor structured to mix a fuel with a compressed working fluid received from the compressor and combust the mixture, the gas turbine engine having a mechanical device that includes a utility fluid receiving portion, a conduit carrying the utility fluid and in fluid communication with the mechanical device, a utility fluid flow splitter configured to received the utility fluid from the conduit and structured to receive a utility working fluid flowing in a bulk fluid direction and direct the utility working fluid into a first split passage and a second split passage, the utility fluid flow splitter having a scoop wall member disposed within the splitter to split the utility working fluid into a first split flow to traverse the first split passage and a second split flow to traverse the second split passage, a first split conduit configured to receive the first split flow from the utility fluid flow splitter, and a second split conduit configured to receive the second split flow from the utility fluid flow splitter.

A feature of the present application provides wherein the second split passage includes a turn downstream of the upstream end of the scoop wall member, the turn oriented to provide a direction of the utility working fluid in the second split passage different than the bulk fluid direction.

Another feature of the present application provides wherein the first split passage provides a direction of the utility working fluid in substantially the same direction of the bulk fluid direction, and wherein the direction of the utility working fluid in the second split passage forms one of a T and a Y with the bulk fluid direction and the direction of utility working fluid in the first split passage.

Yet another feature of the present application provides wherein the turn in the second split passage is curvilinear to discourage flow recirculation or separation areas, and which further includes a pump in fluid communication with the utility fluid flow splitter.

Still another feature of the present application provides wherein the pump is located downstream of the utility fluid flow splitter, and wherein the mechanical device is one of a power section component of the gas turbine engine and a gearbox.

Yet still another feature of the present application provides wherein the scoop wall member presents an arcuate protrusion to a bulk flow as viewed from the bulk fluid direction.

Still yet another feature of the present application provides wherein the scoop wall member is an annular member.

A further feature of the present application provides wherein the scoop wall member is disposed such that the utility working fluid flows around the entire periphery of the annular member.

Another aspect of the present application provides an apparatus comprising a gas turbine engine having an inlet for the supply of air to a compressor, the gas turbine engine having a combustor operable to combust a mixture of fuel and air compressed by the compressor, the gas turbine engine also having a turbine structured to expand a flow stream delivered from the combustor, a lubrication system having a plurality of conduits for the passage of a lubricant to be used with a mechanical device having components lubricated by the lubricant, the plurality of conduits including a feed conduit that provides lubricant to a flow division and wherein the flow division provides lubricant to a first conduit and a second conduit, the flow division having a curvilinear first lateral flow surface that defines a portion of the first conduit and a curvilinear second lateral flow surface that defines a portion of the second conduit, the curvilinear first lateral flow surface disposed on an opposite side of a wall of the flow division from the curvilinear second lateral flow surface.

A feature of the present application provides wherein the second conduit includes a turn along a flow direction.

Another feature of the present application provides wherein the turn forms one of a Y and a T with the feed conduit and the first conduit.

Still another feature of the present application provides wherein the turn includes a smoothly changing shape structured to minimize fluid flow phenomena that decrease fluid flow efficiency, and wherein the curvilinear first lateral flow surface is disposed radially outward of the curvilinear second lateral flow surface.

Yet still another feature of the present application provides wherein fluid flow phenomena is one of flow separation and recirculation zones, and wherein the curvilinear second lateral flow surface is annular.

Still yet another feature of the present application provides wherein the curvilinear first lateral flow surface encircles the curvilinear second lateral flow surface.

A further feature of the present application provides wherein the curvilinear first lateral flow surface is concave and wherein a wall disposed interior to the curvilinear first lateral flow surface includes a portion forming the curvilinear second lateral flow surface.

Yet another aspect of the present application provides an apparatus comprising a gas turbine engine having a flow path for air through a compressor, combustor, and a turbine, the air mixed with fuel and combusted prior to being expanded in the turbine to provide power, the gas turbine engine also having a mechanism that utilizes a utility fluid to provide one of lubrication and heat transfer, a utility fluid system having a first conduit, second conduit, and third conduit carrying the utility fluid, and means for scooping the utility fluid from the first conduit and portioning the utility fluid to the second conduit and to the third conduit.

A feature of the present application further includes means for discouraging the formation of adverse fluid flow phenomena.

A further aspect of the present application provides a method comprising rotating a bladed component in a gas turbine engine to alter a pressure of a working fluid therein, delivering a lubricant to the bladed component from a lubrication circulation system, flowing the lubricant through a supply line to a flow split device, dividing the flow of lubricant on either side of a flow member disposed within the flow split device and that extends upstream into the flow of lubricant, and delivering a first divided flow of lubricant out of the flow split device to a first downstream line and a second divided flow of lubricant out of the flow split device to a second downstream line.

A feature of the present application further includes routing the first divided flow around an outside portion of the second divided flow, wherein the flow member includes a curved shape.

Another feature of the present application further includes forming an annulus of flow with the first divided flow.

Yet another feature of the present application further includes turning the second divided flow into a direction different than a direction of a flow of lubricant from the supply line into the flow split device.

Still another feature of the present application provides wherein the turning includes moving the lubricant along a surface involved in the turning that discourages formation of one of separation and flow recirculation.

Yet still another feature of the present application provides wherein a direction of a flow of lubricant delivered to the first downstream line is substantially the same as a direction of the flow of lubricant in the supply line.

Still yet another feature of the present application further includes providing the lubricant to one of a core power section of the gas turbine engine and a gearbox, and wherein a direction of a flow of lubricant delivered to the second downstream line is different than the direction of the flow of lubricant in the supply line.

A further feature of the present application further includes forming an annular flow of lubricant as a result of the dividing.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
    a gas turbine engine having a rotatable turbomachinery that includes a compressor and turbine, the gas turbine engine also having a combustor structured to mix a fuel with a compressed working fluid received from the compressor and combust the mixture, the gas turbine engine having a mechanical device that includes a utility fluid receiving portion;
    a conduit carrying a utility fluid and in fluid communication with the mechanical device;
    a fluid flow splitter comprising an inlet passage having a first effective cross-sectional area and configured to receive fluid flow from the conduit in a bulk direction;
    an outlet passage;
    a step-out passage linking the inlet passage to the outlet passage;
    a scoop passage extending into the step-out passage, the scoop passage comprising a scoop inlet and a curvilinear scoop wall member configured to direct a portion of fluid flow away from the bulk direction;
    wherein the step-out passage and the scoop passage collectively have a second effective cross-sectional area proximate the scoop inlet that is substantially equal to the first effective cross-sectional area.

2. The apparatus of claim 1 wherein the scoop passage extends into the step-out passage such that a first portion of the utility fluid flows around the entire periphery of the scoop inlet.

3. The apparatus of claim 2 wherein the outlet passage has a third cross-sectional area less than or equal to the first effective cross-sectional area.

4. The apparatus of claim 3 wherein the first portion of the utility fluid traversing the outlet passage is substantially equal to a second portion of the utility fluid traversing the scoop passage.

5. The apparatus of claim 1 wherein the outlet passage is configured to direct the first portion of utility fluid in substantially the bulk direction.

6. The apparatus of claim 1, wherein the outlet passage, the inlet passage and the scoop passage each comprise a portion of exterior wall that is tapered to facilitate one or more hose connections.

7. The apparatus of claim 1, wherein the scoop passage includes a smoothly changing shape structured to minimize fluid flow phenomena that decrease fluid flow efficiency.

8. The apparatus of claim 6, wherein the one or more hose connections comprise a quick connect couplings.

9. The apparatus of claim 6, wherein the one or more hose connections comprise threaded couplings.

10. An apparatus comprising:
a gas turbine engine having an inlet for the supply of air to a compressor, the gas turbine engine having a combustor operable to combust a mixture of fuel and air compressed by the compressor, the gas turbine engine also having a turbine structured to expand a flow stream delivered from the combustor;
a lubrication system having a plurality of conduits for the passage of a lubricant to be used with a mechanical device having components lubricated by the lubricant, the plurality of conduits including a feed conduit that provides lubricant to a fluid flow splitter comprising an inlet passage having a first cross-sectional area and configured to receive lubricant fluid flow in a bulk direction;
an outlet passage configured to direct a first portion of lubricant fluid flow in the bulk direction;
a step-out passage linking the inlet passage to the outlet passage;
a scoop passage extending into the step-out passage, the scoop passage comprising a scoop inlet and a curvilinear scoop wall member configured to direct a second portion of lubricant fluid flow in a direction substantially perpendicular to the bulk direction, the scoop inlet dividing flow proximate the scoop inlet into a circular scoop cross-sectional area and an annular step-out cross-sectional area;
wherein the circular scoop cross-sectional area and the annular step-out cross-sectional area collectively have a cross-sectional area that is substantially equal to the first cross-sectional area.

11. The apparatus of claim 10, wherein the second portion of the lubricant fluid traversing the scoop passage is substantially equal to the first portion of lubricant fluid traversing the scoop passage.

12. The apparatus of claim 10, wherein the outlet passage, the inlet passage and the scoop passage each comprise a portion of exterior wall that is tapered to facilitate one or more hose connections.

13. The apparatus of claim 12, wherein the one or more hose connections comprise quick connect couplings.

14. The apparatus of claim 12, wherein the one or more hose connections comprise threaded couplings.

15. The apparatus of claim 10, wherein the scoop passage extends into the step-out passage such that the first portion of lubricant fluid flows around the entire periphery of the scoop inlet.

16. The apparatus of claim 15, wherein the outlet passage has a second cross-sectional area less than or equal to the first cross-sectional area.

17. The apparatus of claim 10, wherein the lubricant is oil.

* * * * *